US009864220B2

United States Patent
Kojima et al.

(10) Patent No.: US 9,864,220 B2
(45) Date of Patent: Jan. 9, 2018

(54) OPTICAL SENSOR ATTACHMENT STRUCTURE FOR IMAGE DISPLAY DEVICE

(71) Applicant: EIZO Corporation, Ishikawa (JP)

(72) Inventors: Kentaro Kojima, Ishikawa (JP); Shosaku Ikeda, Ishikawa (JP); Naoshi Isobe, Ishikawa (JP); Katsuhiko Matsunami, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 176 days.

(21) Appl. No.: 14/894,461

(22) PCT Filed: May 20, 2014

(86) PCT No.: PCT/JP2014/063369
§ 371 (c)(1),
(2) Date: Nov. 27, 2015

(87) PCT Pub. No.: WO2014/192596
PCT Pub. Date: Dec. 4, 2014

(65) Prior Publication Data
US 2016/0116778 A1  Apr. 28, 2016

(30) Foreign Application Priority Data
May 30, 2013 (JP) .................. 2013-113535

(51) Int. Cl.
*G01J 1/44* (2006.01)
*G02F 1/133* (2006.01)
*G02F 1/1335* (2006.01)

(52) U.S. Cl.
CPC .... *G02F 1/13318* (2013.01); *G02F 1/133615* (2013.01); *G02F 2201/58* (2013.01)

(58) Field of Classification Search
CPC ............ G02F 2201/58; G02F 1/13318; G09G 2360/145; G09G 3/3406
See application file for complete search history.

(56) References Cited

U.S. PATENT DOCUMENTS 6,069,676 A    5/2000  Yuyama
6,188,380 B1 *  2/2001  Kawashima .......... G02F 1/1336
                                                    250/214 AG
(Continued)

FOREIGN PATENT DOCUMENTS

EP    2012177 A1    1/2009
JP    06-130386 A   5/1994
(Continued)

OTHER PUBLICATIONS

International Search Report dated Aug. 5, 2014 from corresponding International Application No. PCT/JP2014/063369; 1 pg.

*Primary Examiner* — Thanh Luu
(74) *Attorney, Agent, or Firm* — Maier & Maier, PLLC

(57) ABSTRACT

Provided is an optical sensor mounting structure for use in image display device devices that can accurately measure the amount of light from a backlight by measuring leak LED light, without having to modify an image display panel module itself. In an image display device using an image display panel module in which a wire drawing port for drawing a wire from a backlight is formed in a panel sheet metal, an optical sensor mounting structure includes an optical sensor configured to measure leak light from the backlight and a positioning member (intermediate connector) positioning the optical sensor. The optical sensor is disposed near the wire drawing port and measures the leak LED light from the wire drawing port.

6 Claims, 20 Drawing Sheets

(56) References Cited

U.S. PATENT DOCUMENTS

| | | |
|---|---|---|
| 2004/0119908 A1 | 6/2004 | Sakai |
| 2007/0091644 A1 | 4/2007 | Fujishima |
| 2008/0143920 A1* | 6/2008 | Back ................. G02F 1/133604 349/58 |

FOREIGN PATENT DOCUMENTS

| | | |
|---|---|---|
| JP | 10049074 A | 2/1998 |
| JP | 2004-021147 A | 1/2004 |
| JP | 2004-199968 A | 7/2004 |
| JP | 2005-148372 A | 6/2005 |
| JP | 2006344429 A | 12/2006 |
| JP | 2007122954 A | 5/2007 |
| JP | 2007317479 A | 12/2007 |
| JP | 3143499 U | 7/2008 |

* cited by examiner

OPTICAL SENSOR ATTACHMENT STRUCTURE FOR IMAGE DISPLAY DEVICE

TECHNICAL FIELD

The present invention relates to an optical sensor mounting structure for use in image display devices.

BACKGROUND ART

Image display devices such as liquid crystal displays, organic electroluminescent displays, and plasma displays provide high-definition image quality with low power consumption. Such image display devices are also slim due to the flat screens thereof. These image display devices are being used not only in offices or households but also at sites of various kinds of professional work, such as graphic design and medical care.

Various efforts have been made to increase the reproducibility of display images produced by liquid crystal image display devices, including the control of the luminance of a backlight in an image display unit by measuring light from the backlight.

Patent Literature 1 discloses a configuration in which an illumination element is exposed by cutting off one edge of light guide means (diffusion plate) in a backlight and in which a light receiving element is exposed by cutting off the other edge of the diffusion plate (see Claims or FIG. 1(B) thereof). In Patent Literature 1, the light receiving element receives light from the backlight as well as light from the outside of the device to reduce the power consumption of the backlight, without distinguishing between the outside light and backlight light.

Patent Literature 2 discloses a configuration in which light from an LED light source in an LED box in a backlight is received by an optical sensor through a light guide (optical fiber) (see paragraph [0028] or FIG. 14 thereof). In Patent Literature 2, the sensor or optical fiber is disposed near the LED and therefore the LED box has to be drilled.

Patent Literature 3 discloses a configuration in which an optical sensor is exposed by obliquely cutting off one edge of a light guide plate in a backlight (see paragraph [0032] or FIG. 4(a) thereof).

Patent Literature 4 discloses a configuration in which a light-shielding member is in contact with one edge of a light guide plate in a backlight and in which light from a pinhole formed in the light-shielding member is received by an optical sensor (see paragraph [0020] or FIG. 1(a) thereof).

Patent Literature 5 discloses a configuration which is provided with an inclined surface for reflecting light from an exposed surface of a side surface of a light guide plate in a backlight toward the back surface thereof and in which the light from the inclined surface is received by an optical sensor (see Claim 2 or FIG. 1 thereof).

Patent Literature 6 discloses a configuration in which a gap is formed in a predetermined position of an area in which the wall surface and bottom surface of a backlight case are connected together and in which a light receiving element is disposed in this position (see paragraph [0057] of FIG. 14 thereof).

Patent Literature 7 discloses a configuration in which a notch is formed at the bottom of an end surface of a light guide plate in a backlight and in which a photodetector is housed in the notch (see paragraph [0029] or FIG. 3(d) thereof).

Patent Literature 8 discloses a backlight unit including at least a frame-shaped chassis, a light guide plate disposed in the chassis, a shield plate disposed at least on the back surface of the light guide plate, a light source disposed on one end surface of the light guide plate, and light detection means disposed on the other end surface of the light guide plate and configured to detect light leaking from the other end surface. In this backlight unit, the shield plate and light detection means are fastened to each other using a screw; the chassis, shield plate, and light guide plate are fastened to each other using screws; and the distance between the other end surface of the light guide plate and the light detection means is kept approximately constant (see Claim 2 or FIG. 1 thereof).

Patent Literature 9 discloses a configuration in which a light guide tube is provided by drilling a backlight module and in which part of light entering a side wall of a rear plate is detected by a detection unit disposed on a soft circuit substrate (see paragraph [0015] or FIG. 4 thereof).

CITATION LIST

Patent Literature

Patent Literature 1: Japanese Unexamined Patent Application Publication No. 06-130386
Patent Literature 2: Japanese Unexamined Patent Application Publication No. 10-049074
Patent Literature 3: Japanese Unexamined Patent Application Publication No. 2004-021147
Patent Literature 4: Japanese Unexamined Patent Application Publication No. 2004-199968
Patent Literature 5: Japanese Unexamined Patent Application Publication No. 2005-148372
Patent Literature 6: Japanese Unexamined Patent Application Publication No. 2006-344429
Patent Literature 7: Japanese Unexamined Patent Application Publication No. 2007-317479
Patent Literature 8: Japanese Unexamined Patent Application Publication No. 2007-122954
Patent Literature 9: Japanese Registered Utility Model No. 3143499

SUMMARY OF INVENTION

Technical Problem

For example, a liquid crystal display module is formed by: a liquid crystal display panel; a backlight disposed behind the liquid crystal display panel; and a reflection sheet and a panel sheet metal disposed behind the backlight. Disposed behind the panel sheet metal is a structure such as a base sheet plate or an exterior molded component.

When such a liquid crystal display panel module is manufactured or outsourced, it is important that the liquid crystal display panel module conform to a standard specification if possible, in terms of production control or distribution management. In particular, as production bases are expanding globally, there is a demand to provide an image display device that uses a liquid crystal display panel module conforming to a standard specification and increases the reproducibility of display images by measuring light from a backlight using a simple, reliable method and thus controlling the luminance of the backlight.

Unfortunately, in any of Patent Literatures 1 to 9, a backlight is subjected to a modification such as drilling. That is, what Patent Literatures 1 to 9 disclose are not standard products but custom products. Specifically, Patent Literature 1 requires that one edge of a diffusion plate be cut off; Patent Literature 2 requires that an LED box be subjected to drilling or the like to dispose a sensor or optical fiber near an LED; Patent Literature 3 requires that one edge of a light guide plate be obliquely cut off; Patent Literature 4 requires that a backlight itself be modified in order to bring a light-shielding member into contact with one edge of a light guide plate in the backlight. Patent Literature 5 requires that there be provided an inclined surface for reflecting light from an exposed surface of a side surface of a light guide plate in a backlight toward the back surface thereof. Patent Literature 6 requires that a gap be formed in a predetermined position of a backlight case. Patent Literature 7 requires that a notch be formed at the bottom of an end surface of a light guide plate in a backlight. Patent Literature 8 requires that a shield plate and light detection means be fastened to each other using a screw and that a chassis, the shield plate, and a light guide plate be fastened to each other using screws. Patent Literature 9 requires that a backlight module be drilled.

The present inventors investigated multiple liquid crystal display panel modules conforming to standard specifications. The present inventors then found that a wire drawing port for drawing a wire from a backlight was formed in a panel sheet metal and that LED light was leaking from the wire drawing port of the panel sheet metal. That is, an LED serving as the light source of the backlight was connected to a power supply drive circuit through a predetermined wire line. The present inventors then found that the wire drawing port of the panel sheet metal was formed so as to be a little too large for purposes such as allowing a wire harness, lead line, or the like serving as the wire line to easily pass therethrough and that LED light could be obtained from the gap between the wire drawing port and the lead line or the like. The present inventors further found that if leak LED light from the wire drawing port of the panel sheet metal could be measured properly, it was possible to provide an image display that could increase the reproducibility of display images by measuring light from a backlight using a simple, reliable method and thus controlling the luminance of the backlight even in a liquid crystal display panel module conforming to a standard specification.

Accordingly, an object of the present invention is to provide an optical sensor mounting structure for use in image display devices that can accurately measure the amount of light from a backlight by measuring leak LED light, without having to modify an image display panel module itself.

Solution to Problem

The present invention provides an optical sensor mounting structure for use in an image display device, the image display device using an image display panel module in which a wire drawing port for drawing a wire from a backlight is formed in a panel sheet metal. The structure includes an optical sensor configured to measure leak light from the backlight and a positioning member configured to position the optical sensor. The optical sensor is disposed near the wire drawing port by the positioning member and measures the leak light from the wire drawing port.

According to the present invention, leak LED light can be obtained and measured without having to modify the image display panel module itself. Since the wire drawing port for drawing the wire from the backlight is formed in the panel sheet metal and the optical sensor is disposed near the wire drawing port by the positioning member, the amount of light leaking from the wire drawing port can be accurately measured.

An LED serving as the light source of the backlight is connected to a power supply drive circuit through a predetermined wire line. Specifically, to drive the LED serving as the light source of the backlight, a wire harness, a lead line provided with a connector, a flexible wiring substrate, a lead line, or the like is drawn from the LED or LED mounting substrate and connected directly to the power supply drive circuit or connected to the power supply drive circuit through a wire connector serving as a wiring path. The wire drawing port of the panel sheet metal is formed so as to be a little too large so that the wire connector, lead line, or the like serving as a wire line can easily pass therethrough. Thus, LED light can be obtained from the gap between the wire drawing port and the lead line or the like.

The optical sensor is electrically connected to a substrate, lead line, or flexible wiring board, for example, by disposing it on the substrate or connecting it to the lead line or flexible wiring board. The optical sensor may be mounted on a mounting substrate or may be positioned on a plate material or the like. The optical sensor may also directly or indirectly detect leak light from the wire drawing port. For example, the positioning member may be mounted on a substrate having the optical sensor mounted thereon and then bonded and fixed to the panel sheet metal or a base sheet metal. For example, a lead line or a flexible wiring board having the optical sensor connected thereto may be fixed using a tape. For example, the optical sensor or a holding component holding the optical sensor may be press-fitted, fitted, or bonded and fixed to the gap in the wire drawing port. For example, leak light may be applied to the optical sensor through an optical fiber or light guide, as in a configuration in which leak light is detected indirectly by inserting one end of an optical fiber or light guide formed of a transparent resin or glass into the wire drawing port and opposing the other end thereof to the optical sensor.

In the present invention, a wire connector for connecting the wire from the backlight is disposed in the wire drawing port, and the positioning member is mounted on a substrate having the optical sensor disposed thereon.

According to the present invention, the wire connector is disposed in the wire drawing port. Thus, it is easy to position the optical sensor. Further, after disposing the optical sensor in a predetermined position, a wire line from the wire connector to the power supply drive circuit can be routed. Thus, it is easy to assemble the image display device. Further, since the positioning member is mounted on the substrate having the optical sensor mounted thereon, it is easy to locate the optical sensor in a precise position. Thus, it is easy to assemble the image display device.

The positioning member is a member for disposing the optical sensor near the wire drawing port. Examples of the positioning member include a connector, an intermediate connector, a spacer, an inclining member, a member mounted on the wire connector, a member mounted on the panel sheet metal, and combinations thereof.

In the present invention, the positioning member is an intermediate connector, and the intermediate connector is connected to the wire connector.

According to the present invention, the intermediate connector is mounted on the substrate having the optical sensor mounted thereon, and the intermediate connector is connected to the wire connector. Thus, it is easy to dispose the optical sensor near the wire drawing port and in a precise position. The intermediate connector is mounted on the substrate surface having the optical sensor mounted thereon. On the other hand, a second wire connector for routing a wire line from the substrate to the power supply drive circuit is mounted on the substrate, or a lead line or a wire of a flexible circuits or the like is connected to the substrate.

In the present invention, the positioning member is a spacer, and the spacer is mounted on the wire drawing port.

According to the present invention, it is easy to dispose the optical sensor near the wire drawing port and in a precise position. The spacer is formed of a resin, rubber material, metal, or the like. In some types of liquid crystal display panel modules, a lead line or a flexible wiring board or the like is drawn from the wire drawing port, and a gap is formed in the wire drawing port. For example, a spacer is formed from an elastic member such as a resin or rubber material so as to have a shape corresponding to the wire drawing port and a larger size than the wire drawing port; a lead guide hole for passing a lead line or a flexible wiring board or the like and a slit are formed in the spacer; the spacer is mounted in the wire drawing port, for example, by fitting or bonding; and the optical sensor is mounted on the spacer, for example, by fitting or bonding it to the sensor guide hole formed in the spacer. Thus, it is easy to dispose the optical sensor near the wire drawing port and in a precise position.

The types of backlights include edge-lit type (also called light guide plate type) and direct-lit type. No matter which of these the type of the backlight is or no matter where the LED serving as the light source of the backlight is disposed, it is preferred to increase the amount of the received leak light by disposing the sensor in a direction in which the directivity of light from the LED is strong, considering the positional relationship between the LED and wire drawing port (reference surface). Accordingly, in the present invention, assuming that the wire drawing port is a reference surface, the sensor is preferably disposed so as to be inclined with respect to the reference surface so that the amount of the received leak light is increased.

In the present invention, the positioning member is an inclining member, and the inclining member inclines the optical sensor so that the amount of the received leak light is increased.

Light from the LED travels toward the image display panel through a light guide plate or directly travels toward the image display panel. However, part of the light leaks from the wire drawing port, becoming leak light. Most of the components of the leak light obliquely exit the reference surface. Accordingly, when the sensor is disposed in parallel with the reference surface or when the sensor is disposed perpendicular to the reference surface, the amount of received leak LED light is drastically reduced. According to the present invention, the sensor is disposed so as to be inclined with respect to the reference surface in a direction in which the amount of the received leak light is increased. Thus, a sufficient amount of the leak LED light is easily received.

In the present invention, tubular cushions for preventing entry of outside light into the optical sensor may be bonded to the optical sensor, and the panel sheet metal or the base sheet metal of the image display device. Examples of the shape of the tubular cushions include cylindrical, quadrangular tubular, hexagonal tubular, and other polygonal tubular shapes. Examples of the material of the tubular cushions include rubber materials, including urethane and silicone, and sponge foams formed of a rubber material such as urethane or silicone. Other known cushion materials may be used.

An image display device of the present invention includes any one of the optical sensor mounting structures. Luminance of a backlight is controlled by measuring leak light from a wire drawing port formed in a panel sheet metal.

According to the present invention, there is provided a high-quality image display device that accurately measures the amount of light from a backlight to control the luminance of the backlight.

Advantageous Effects of Invention

According to the present invention, the leak LED light can be obtained and measured without having to modify the image display panel module itself. Specifically, the wire drawing port for drawing the wire from the backlight is formed in the panel sheet metal, and the optical sensor is disposed near the wire drawing port by the positioning member. Thus, the amount of the leak light from the wire drawing port can be accurately measured.

According to the present invention, there is provided a high-quality image display device that accurately measures the amount of light from a backlight to control the luminance of the backlight. Further, an image display device including the optical sensor mounting structure of the present invention is easily provided without having to make a significant change to the design.

BRIEF DESCRIPTION OF THE DRAWINGS

FIG. 4 include diagrams showing an optical sensor mounting unit serving as the optical sensor mounting structure of the first embodiment, in which FIG. 4(a) is a plan view and FIG. 4(b) is a bottom view.

FIG. 5 include diagrams showing the optical sensor mounting unit serving as the optical sensor mounting structure of the first embodiment, in which FIG. 5(a) is a front view and FIG. 5(b) is a back view.

FIG. 7 include diagrams showing the optical sensor mounting unit serving as the other example of the optical sensor mounting structure of the first embodiment, in which FIG. 7(a) is a plan view and FIG. 7(b) is a bottom view.

FIG. 8 include diagrams showing the optical sensor mounting unit serving as the other example of the optical sensor mounting structure of the first embodiment, in which FIG. 8(a) is a front view and FIG. 8(b) is a back view.

FIG. 13 include diagrams showing an optical sensor mounting unit serving as the optical sensor mounting structure of the second embodiment, in which FIG. 13(a) is a plan view and FIG. 13(b) is a bottom view.

FIG. 14 include diagram showing the optical sensor mounting unit serving as the optical sensor mounting structure of the second embodiment, in which FIG. 14(a) is a front view and FIG. 14(b) is a right side view.

FIG. 19 include diagrams showing a spacer of the fourth embodiment, in which FIG. 19(a) is a plan view and FIG. 19(b) is a side view.

FIG. 20 include diagrams showing another example of the spacer of the fourth embodiment, in which FIG. 20(a) is a plan view and FIG. 20(b) is a side view.

DESCRIPTION OF EMBODIMENTS

Now, embodiments of the present invention will be described with reference to the drawings.

Embodiments of Present Invention

Figure 1:
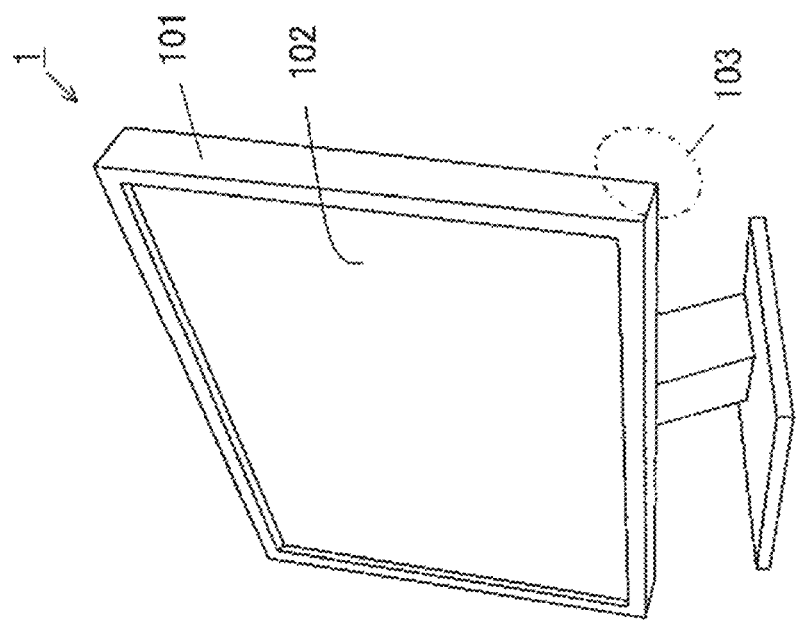
FIG. 1 is a perspective view illustrating an image display device including an optical sensor mounting structure of the present invention.

FIG. 1 is a perspective view illustrating an image display device including an optical sensor mounting structure of the present invention. Hereafter, a liquid crystal image display device 1 will be described as an example. The liquid crystal image display device 1 includes a liquid crystal display module, a controller, and a case. In the present embodiment, a known liquid crystal display panel module is provided with an optical sensor mounting unit 10 serving as the optical sensor mounting structure of the present invention. The liquid crystal display module is formed by: a liquid crystal display panel 102; a backlight 150 disposed behind the liquid crystal display panel 102; and a reflection sheet and a panel sheet metal 105 disposed behind the backlight 150. Disposed behind the panel sheet metal 105 is a base sheet metal 106. The case is composed of a frame 101 and a back panel 107 and houses the components (see FIGS. 2, 9, and the like). In FIG. 1 and the like, an area surrounded by an alternate long and short dashed line (reference sign 103) represents an area housing the optical sensor mounting unit 10 serving as the optical sensor mounting structure of the present invention.

Figure 9:
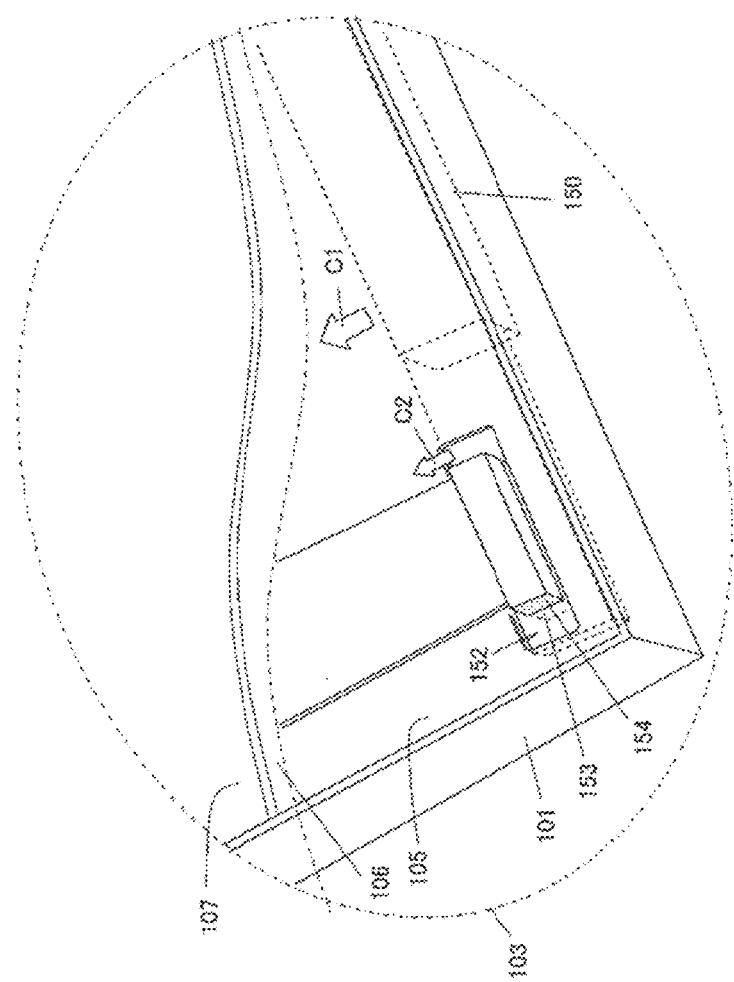
FIG. 9 is a perspective view showing the internal structure of a wire drawing port for drawing a wire from a backlight in a known image display device and its vicinity and is a diagram showing a state in which connecters are connected together.
Figure 10:
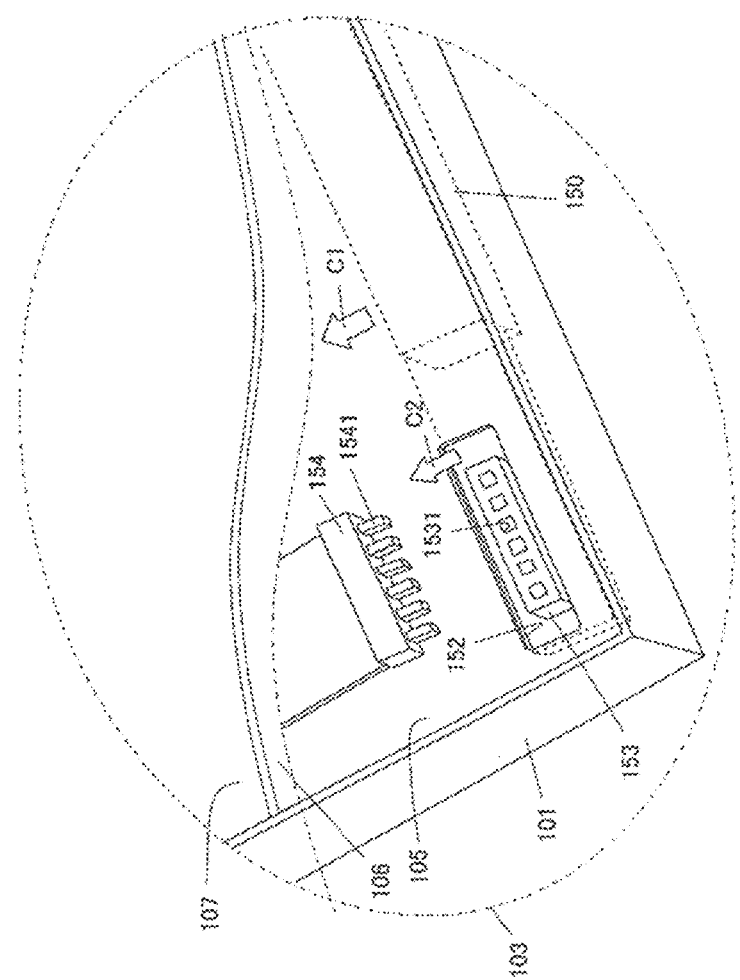
FIG. 10 is a perspective view showing the internal structure of the wire drawing port for drawing the wire from the backlight in the known image display and its vicinity and is a diagram showing a state in which the connecters are disconnected from each other.

FIGS. 9 and 10 are perspective views showing the internal structure of a wire drawing port 152 for drawing a wire from the backlight 150 of a known image display device and the vicinity of the port. As shown in FIG. 9, connectors are connected together in a normal operating state. On the other hand, a state in which the connectors are disconnected from each other is shown in FIG. 10 to describe a modification of the present invention. In examples shown in FIGS. 2, 9, 10, and the like, the backlight 150 is disposed in a lower part of the liquid crystal image display device; the panel sheet metal 105 is disposed behind the backlight 150; and the wire drawing port 152 for drawing the wire from the backlight 150 is formed near a lower corner of the panel sheet metal 105. The wire drawing port 152 is a rectangular hole formed by sheet metal press or the like. Disposed directly below the wire drawing port 152 is a female wire connector 153 for forming a wire leading to the backlight 150, such as a power supply line. A wire line leading to the backlight 150, such as a power supply line, is formed by inserting a terminal 1541 of a male wire connector 154 into a hole 1531 of the female wire connector 153 and thus connecting these connectors electrically (FIGS. 9 and 10). The wire drawing port 152 is formed in a slightly larger size than those of the wire connector 153 and wire connector 154 (FIGS. 9 and 10). Thus, it is easy to connect the connectors. For example, the size of the wire drawing port 152 is set so as to be larger by about 1 to 3 mm on one side than that of the connector 153.

Figure 2:
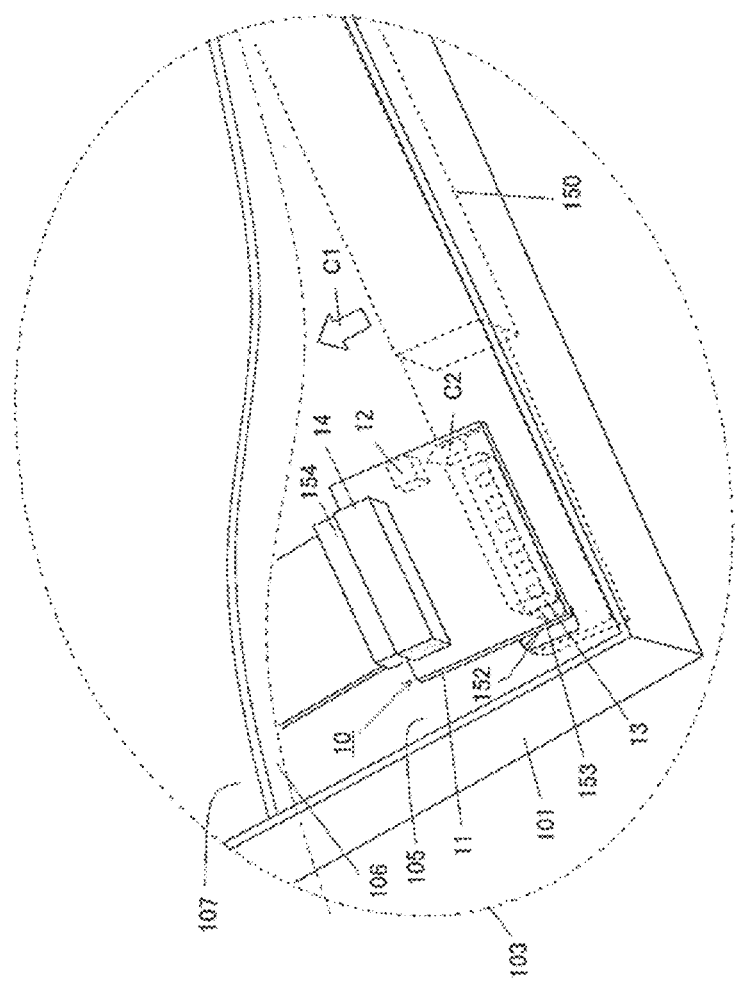
FIG. 2 is a perspective view showing the internal structure of an optical sensor mounting structure of a first embodiment of the present invention.

In FIGS. 2, 9, 10, and like, an arrow C1 shows main LED light, whereas an arrow C2 shows leak LED light. The present inventors found that LED light was leaking from the wire drawing port 152 of the panel sheet metal 105. Specifically, the LED serving as the light source of the backlight 150 is connected to a power supply drive circuit through a predetermined wire line; the wire drawing port 152 of the panel sheet metal 105 is formed in a little too large size for purposes such as allowing the wire connectors 153 and 154 forming a wire line to pass therethrough; and the inventors found that it was possible to obtain leak LED light C2 from the gap between the wire drawing port 152 and wire connectors 153 and 154. The present inventors further found that by measuring the leak LED light C2, it was possible to a provide an image display device 1 that increased the reproducibility of display images by measuring light from the backlight 150 using a simple, reliable method and thus controlling the luminance of the backlight 150 even in a liquid crystal display panel module conforming to a standard specification. While the wire drawing port 152 is disposed near a lower corner of the panel sheet metal 105 in FIGS. 9 and 10, the wire drawing port 152 is disposed in a side surface of the panel sheet metal 105 in some known image display devices. In such image display devices, an opening is formed in a corresponding position of the frame 101 so as to prevent the frame 101 from blocking the wire drawing port 152.

First Embodiment

Figure 3:
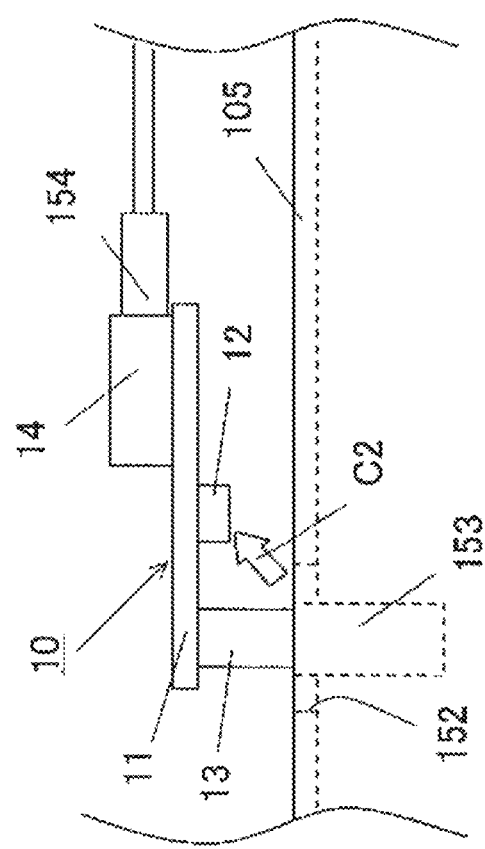
FIG. 3 is a side view showing the internal structure of the optical sensor mounting structure of the first embodiment.
Figure 4:
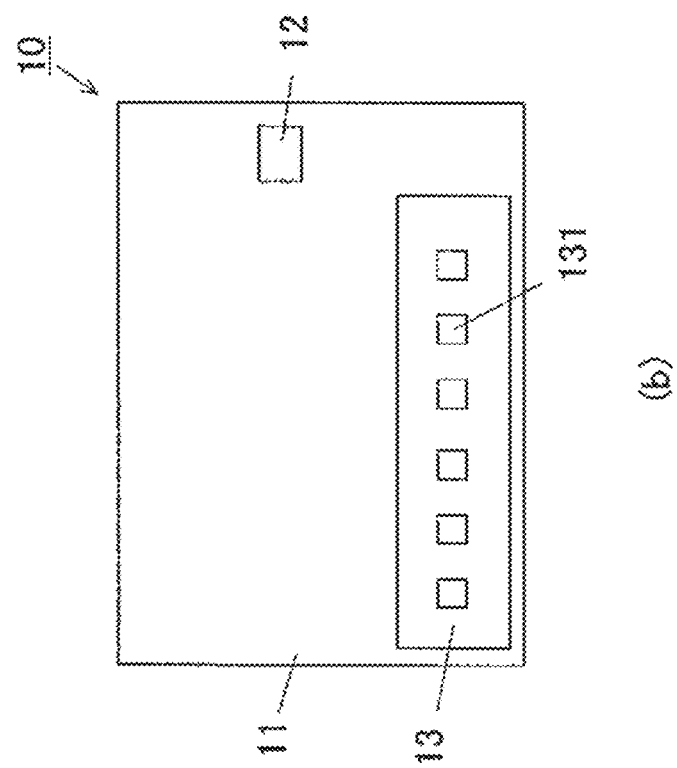
Figure 4:
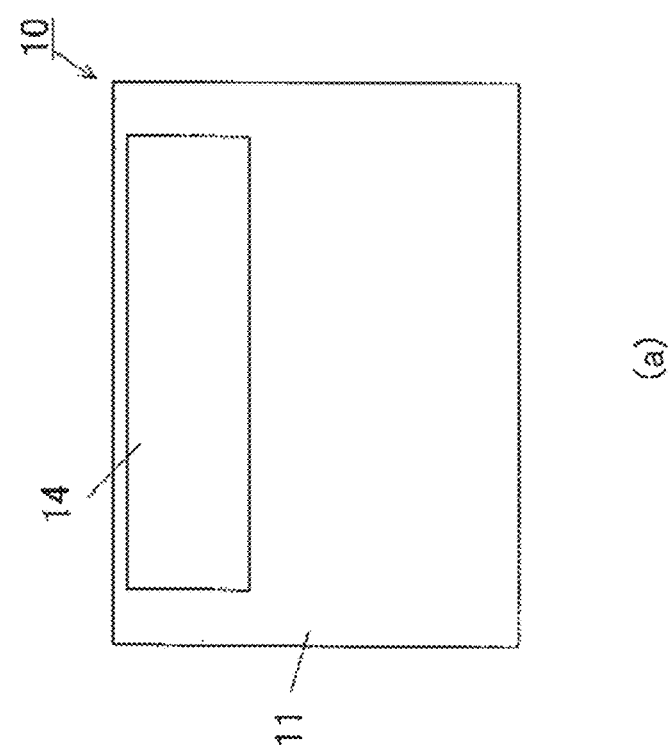
Figure 5:
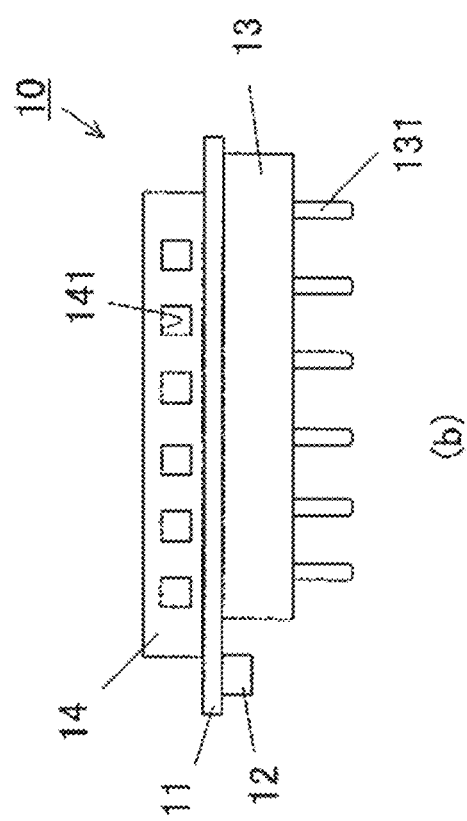
Figure 5:
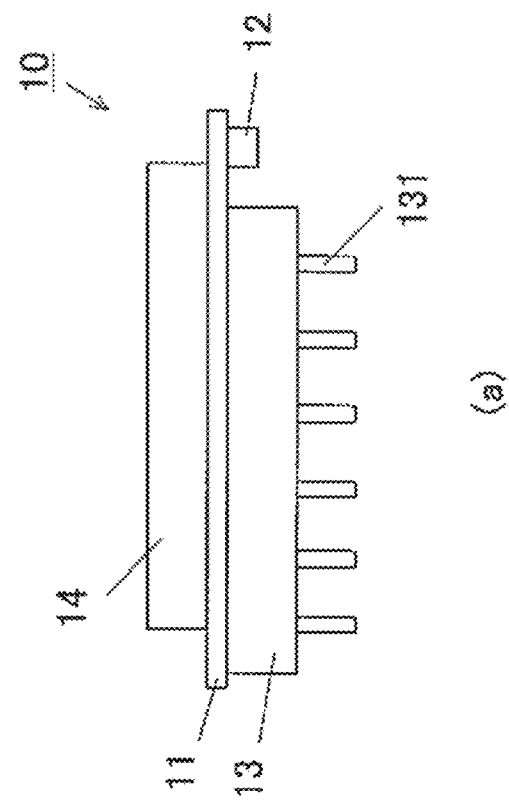

FIG. 2 is a perspective view showing the internal structure of an optical sensor mounting unit 10 serving as an optical sensor mounting structure of a first embodiment of the present invention. FIG. 3 is a side view showing the internal structure of the optical sensor mounting unit 10. FIGS. 4 and 5 are diagrams showing the optical sensor mounting unit 10. FIG. 4(a) is a plan view; FIG. 4(b) is a bottom view; FIG. 5(a) is a front view; and FIG. 5(b) is a back view.

In the optical sensor mounting unit 10 of the present embodiment, a female intermediate connector 14 is mounted on the upper surface of a quadrangular substrate 11 [FIGS. 2, 3, 4(a)], and a male intermediate connector 13 and an optical sensor 12 are mounted on the lower surface of the substrate 11 [FIGS. 2, 3, 4(b)]. A terminal 131 of the male intermediate connector 13 is inserted into a hole 1531 of the female wire connector 153 disposed directly below the wire drawing port 152 and thus the connectors are electrically connected together. A terminal 1541 of the male wire connector 154 is inserted into a hole 141 of the female intermediate connector 14 and thus the connectors are electrically connected together. These connected connectors form a wire line leading to the backlight 150, such as a power supply line (FIGS. 2 and 3). A signal line (not shown) from the optical sensor 12 is connected to a controller. For example, when the female intermediate connector 14 has an available slot, the signal line is connected to the controller using the slot. The optical sensor 12 aims to measure the leak LED light C2 and is disposed in a position in which light is not blocked by the male intermediate connector 13 (FIGS. 2, 5(a), and 5(b)).

According to the present embodiment, the male intermediate connector 13 is mounted on the substrate 11 having the optical sensor 12 mounted thereon, and the intermediate connector 13 is connected to the wire connector 153. Thus, it is easy to dispose the optical sensor 12 near the wire drawing port 152 and in a precise position. While, in the present embodiment, the terminal 131 of the male intermediate connector 13 is inserted into the hole 1531 of the female connector 153, the male and female connectors may be reversed as long as the connectors can form a male-female pair. Similarly, while, in the present embodiment, the terminal 1541 of the male connector 154 is inserted into the hole 141 of the female intermediate connector 14 mounted on the substrate 11 and thus the connectors are connected together, a lead line or a flexible circuits or the like may be directly connected to the substrate 11.

Figure 6:
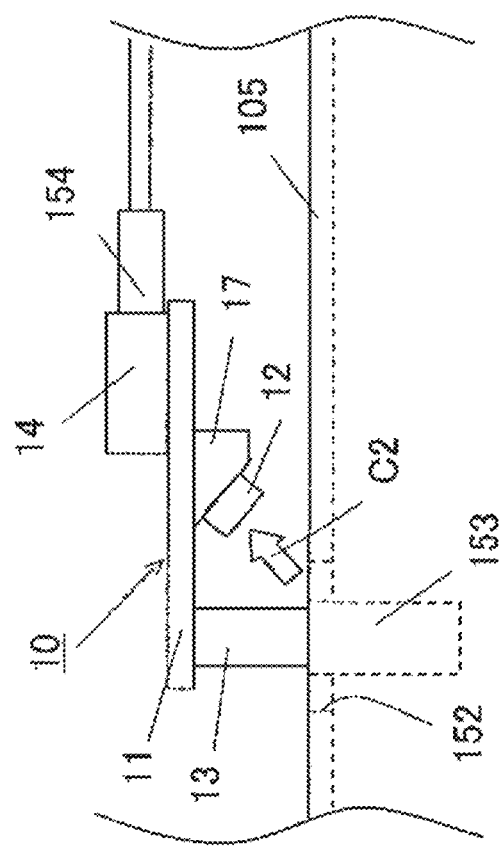
FIG. 6 is a side view showing the internal structure of another example of the optical sensor mounting structure of the first embodiment.
Figure 7:
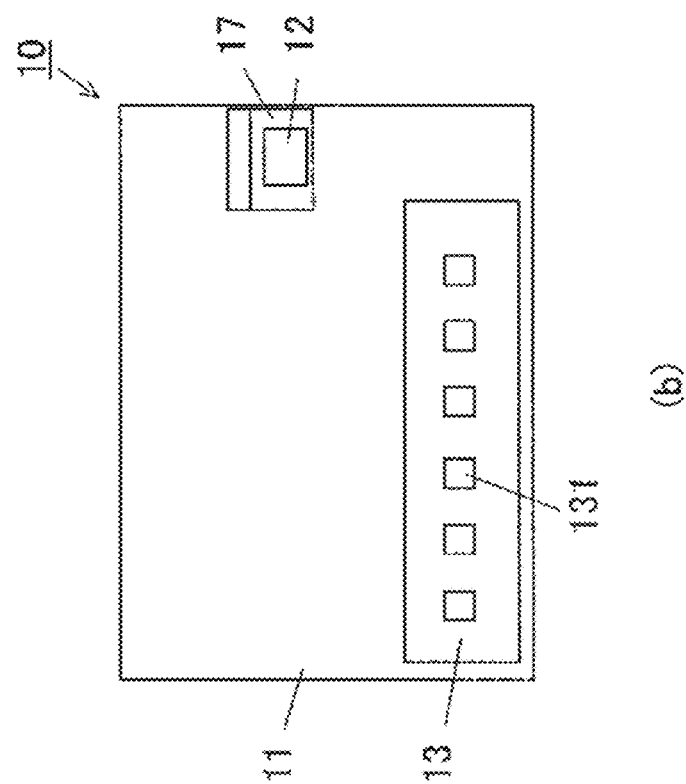
Figure 7:
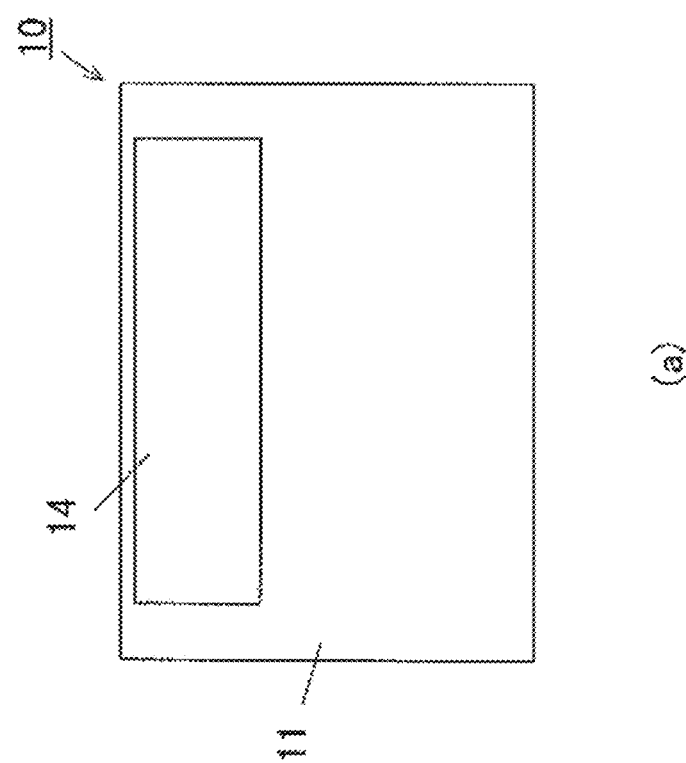
Figure 8:
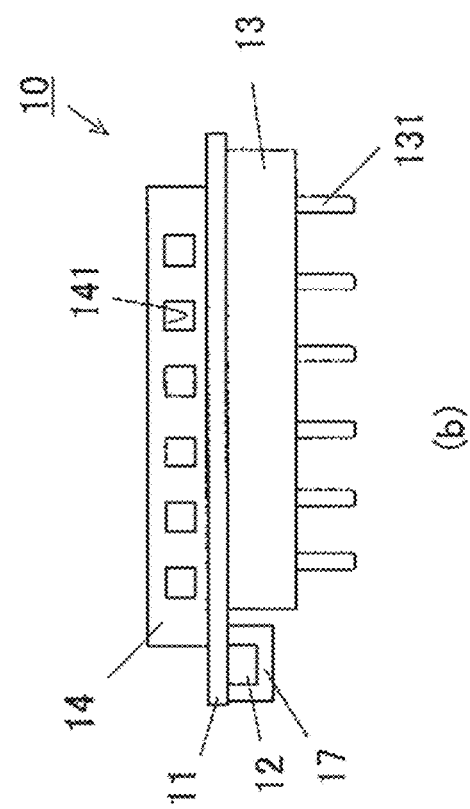
Figure 8:
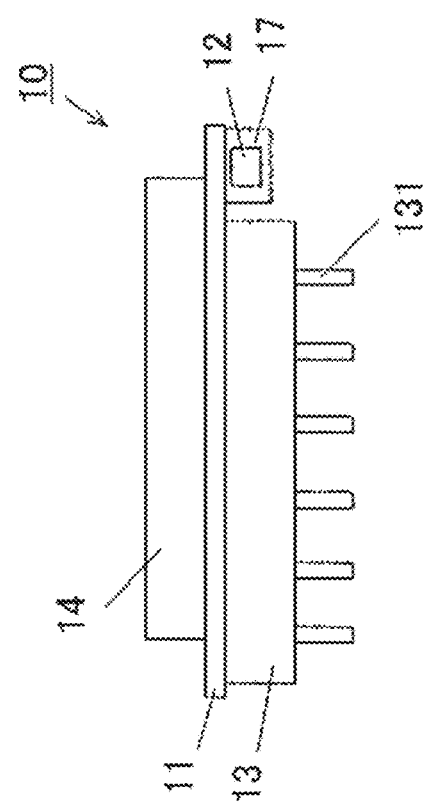

FIG. 6 is a side view showing the internal structure of another example of the optical sensor mounting structure of the present embodiment. FIGS. 7 and 8 are diagrams showing an optical sensor mounting unit 10. FIG. 7(a) is a plan view; FIG. 7(b) is a bottom view; FIG. 8(a) is a front view; and FIG. 8(b) is a back view.

Assuming that the wire drawing port 152 is a reference surface, the LED of the backlight 150 is disposed in a direction approximately parallel with the reference surface. Light C1 from the LED travels toward the image display panel through a light guide plate, or directly travels toward the image display panel. However, part of the light leaks from the wire drawing port 152, becoming leak light C2. Most of the components of the leak light C2 exit the reference surface obliquely. Accordingly, it is preferable that the optical sensor 12 be inclined with respect to the reference surface in a direction in which the amount of received light is increased. For this reason, in the present embodiment, an inclining member 17 having an inclined surface is first disposed on the substrate 11 and then the optical sensor 12 is mounted on the inclined surface of the inclining member 17 (FIG. 6). According to the present embodiment, by disposing the optical sensor 12 so as to be inclined with respect to the reference surface, it is easy to receive a sufficient amount of leak LED light C2. The inclination angle of the optical sensor 12 with respect to the reference surface varies with conditions. For example, the inclination angle is set to 5 degrees or more and 45 degrees or less. This is because when the inclination angle is less than 5 degrees, an increase in the amount of received light is hardly expected; when the inclination angle is more than 45 degrees, the leak light C2 from the wire drawing port 152 is difficult to detect. While, in the present embodiment, the luminance of the backlight 150 is controlled by measuring the leak light C2 from the wire drawing port 152 formed in the back surface of the backlight, the present invention can also be applied to a configuration in which a wire drawing port is formed in a side surface of a backlight.

Second Embodiment

Figure 11:
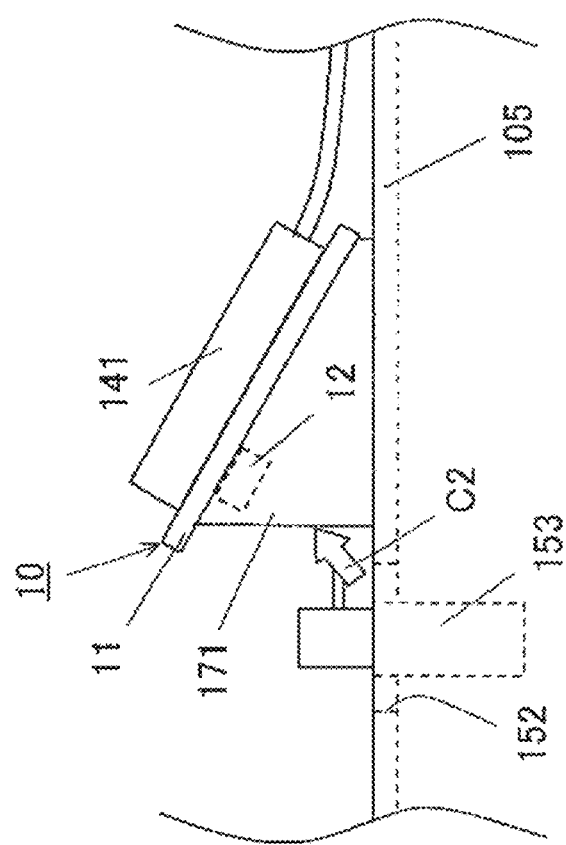
FIG. 11 is a side view showing the internal structure of an optical sensor mounting structure of a second embodiment of the present invention.
Figure 12:
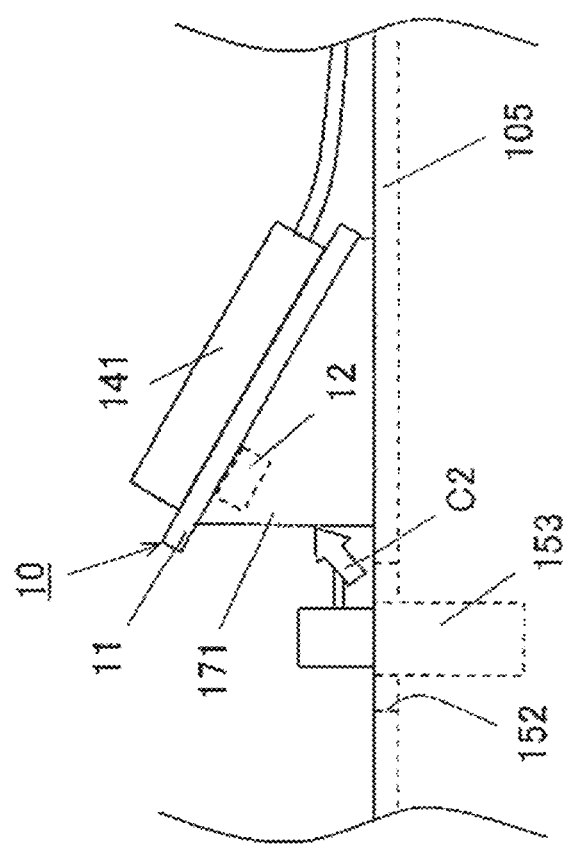
FIG. 12 is a side view showing the internal structure of the optical sensor mounting structure of the second embodiment.
Figure 13:
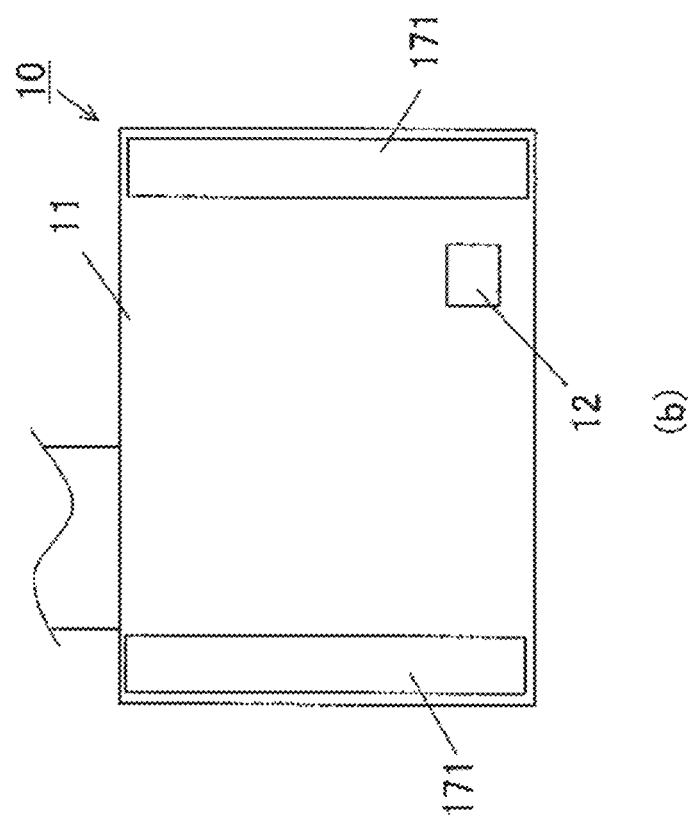
Figure 13:
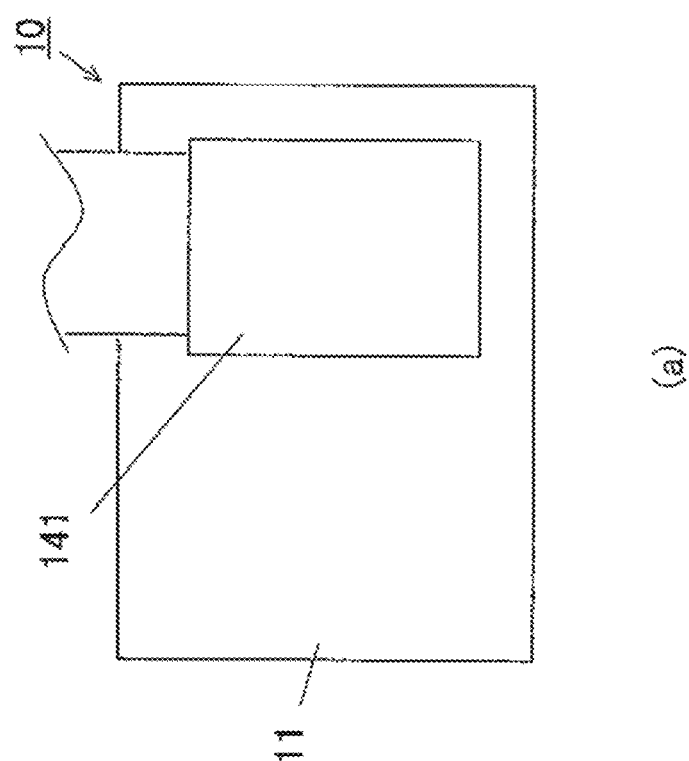
Figure 14:
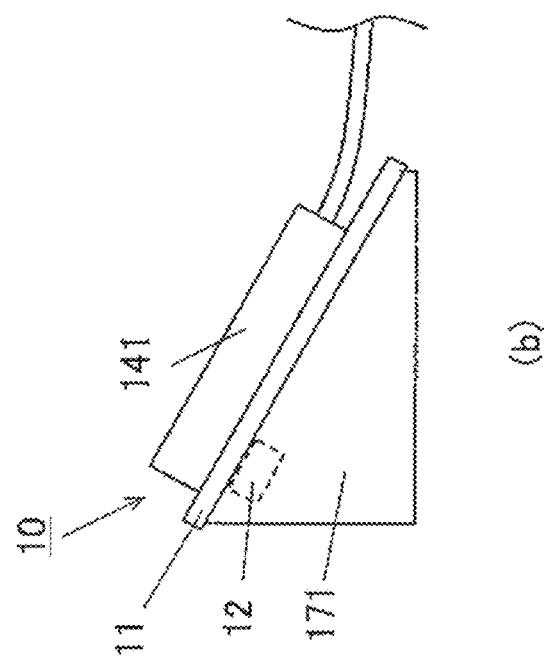
Figure 14:
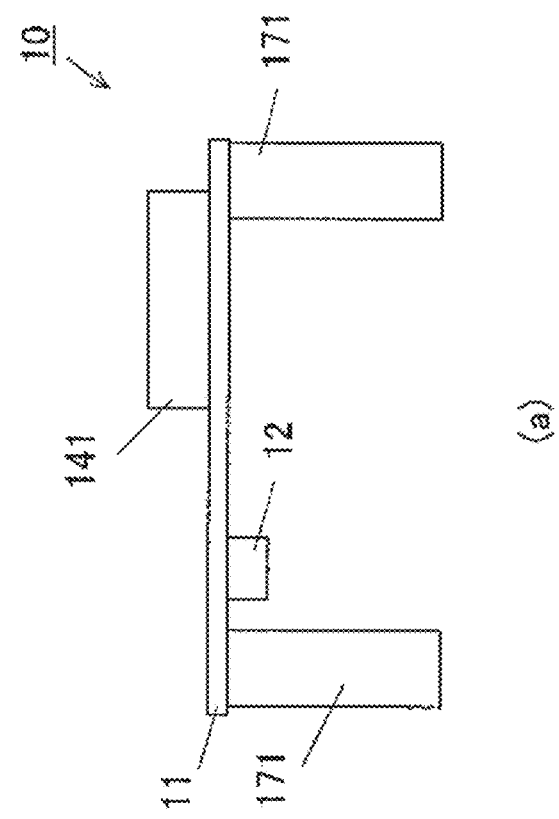

FIG. 11 is a side view showing the internal structure of an optical sensor mounting unit 10 serving as an optical sensor mounting structure of a second embodiment of the present invention. FIG. 12 is a side view showing the internal structure of the optical sensor mounting unit 10. FIGS. 13 and 14 are diagrams showing the optical sensor mounting unit 10. FIG. 13(a) is a plan view; FIG. 13(b) is a bottom view; FIG. 14(a) is a front view; and FIG. 14(b) is a right side view. In the present embodiment, the same reference signs as those in the first embodiment denote the same functions and therefore description thereof will be omitted as appropriate.

In the optical sensor mounting unit 10 of the present embodiment, a flexible wiring board 141 is mounted on the upper surface of a quadrangular substrate 11 [FIGS. 11, 12, 13(a)]; an optical sensor 12 is mounted on the lower surface of the substrate 11; and inclining members 171 each having an inclined surface are mounted on both sides of the substrate 11 [FIGS. 11, 12, 13(b)]. A signal line from the optical sensor 12 is connected through the flexible wiring board 141 to a controller. The inclining members 171 each having an inclined surface are triangular in a side view [FIGS. 12, 14(b)] and are fastened to the substrate 11 using an adhesive or double-sided tape, as well as fastened to a panel sheet metal 105 using an adhesive or double-sided tape. The inclining members 171 are formed of a resin, rubber material, metal, or the like. The optical sensor 12 aims to measure leak LED light C2 from the gap between connectors 153 and 154 and a wire drawing port 152 and is disposed in a position in which light is not blocked by other components [FIGS. 11, 13(a), and 14(a)].

According to the present embodiment, the inclining members 171 each having an inclined surface are mounted on the substrate 11 having the optical sensor 12 mounted thereon, and the inclining members are bonded to the panel sheet metal 105. Thus, it is easy to dispose the optical sensor 12 near the wire drawing port 152 and in a precise position. Further, assuming that the wire drawing port 152 is a reference surface, the optical sensor 12 is disposed so as to be inclined with respect to the reference surface in a direction in which the amount of the received leak LED light C2 is increased. Thus, a sufficient amount of leak LED light C2 can be easily received. While, in the present embodiment, the luminance of the backlight 150 is controlled by measuring the leak light C2 from the wire drawing port 152 formed in the back surface of the backlight, the present invention can also be applied to a configuration in which a wire drawing port is formed in a side surface of a backlight. While, in the present embodiment, the connectors 153 and 154 are disposed in the wire drawing port 152 of the panel sheet metal 105, a wire harness, a flexible wiring board, a lead line, or the like may be drawn from the wire drawing port 152 of the panel sheet metal 105 and connected to a power supply drive circuit or the like. The present invention can also be applied to such a configuration as long as the leak LED light C2 can be obtained from the gap between the wire drawing port 152 and the lead line or the like.

Third Embodiment

Figure 15:
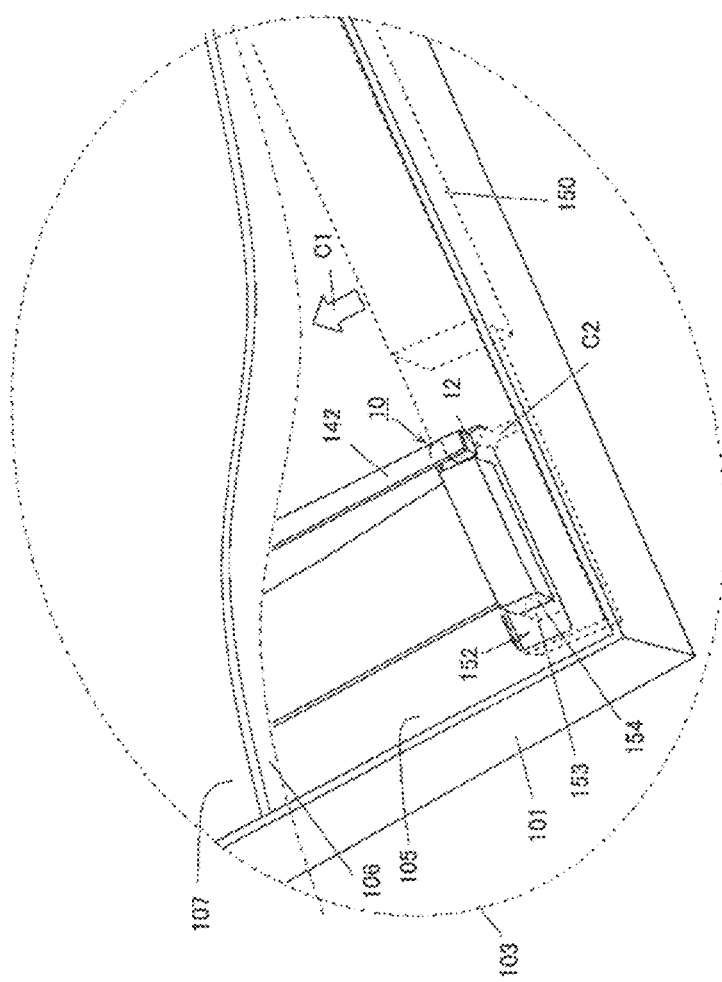
FIG. 15 is a perspective view showing the internal structure of an optical sensor mounting structure of a third embodiment of the present invention.

FIG. 15 is a perspective view showing the internal structure of an optical sensor mounting unit 10 serving as an optical sensor mounting structure of a third embodiment of the present invention. In the present embodiment, the same reference signs as those in the above embodiments denote the same functions and therefore description thereof will be omitted as appropriate.

In the optical sensor mounting unit 10 of the present embodiment, an optical sensor 12 is mounted on the lower surface of a flexible wiring board 142 (FIG. 15). The optical sensor 12 aims to measure leak LED light C2 from the gap between connectors 153, 154 and a wire drawing port 152 and is disposed in the gap with the light receiving surface of the optical sensor 12 oriented downward (FIG. 15). The lower surface of the flexible wiring board 142 and a panel sheet metal 105 are bonded together using a double-sided tape or adhesive.

According to the present embodiment, the optical sensor 12 can be disposed closest to the wire drawing port 152, and the amount of received leak LED light C2 is maximized.

Figure 16:
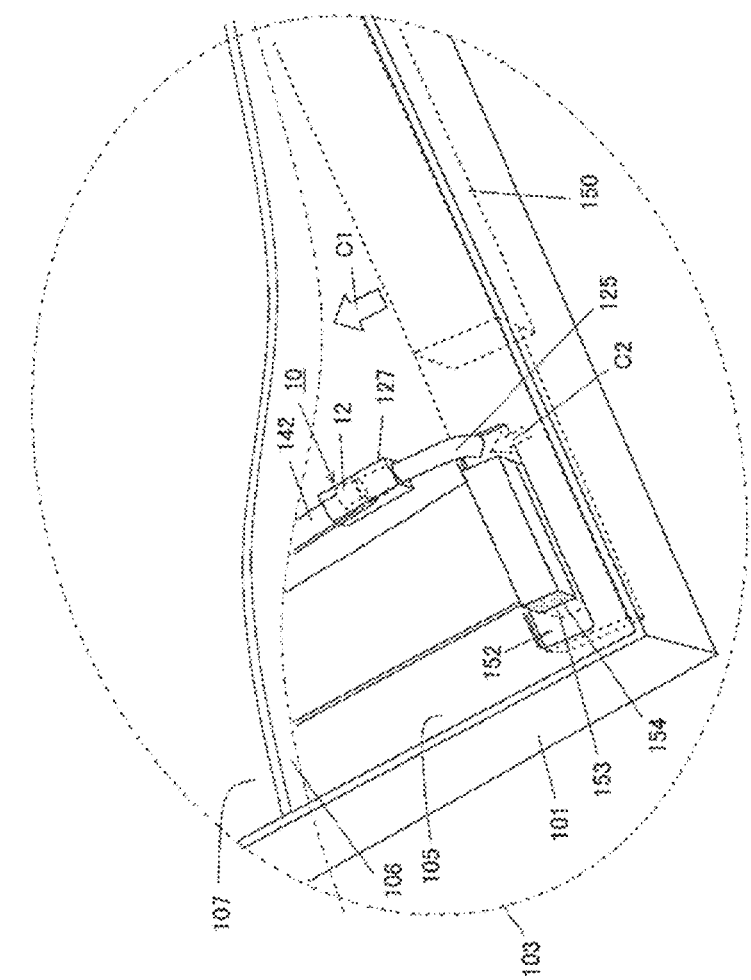
FIG. 16 is a perspective view showing the internal structure of another example of the optical sensor mounting structure of the third embodiment.

FIG. 16 is a perspective view showing the internal structure of another example of the optical sensor mounting structure of the present embodiment. In this example, the same reference signs as those in the above embodiments denote the same functions and therefore description thereof will be omitted as appropriate.

In the optical sensor mounting unit 10 of this example, an optical sensor 12 is mounted on the upper surface of a flexible wiring board 142; one end of an optical fiber 125 (or light guide 125) is disposed so as to be opposed to the optical sensor 12; and the perimeter of the end is supported and fixed by a tubular support member 127 (FIG. 16). The optical fiber 125 (or light guide 125) aims to measure leak LED light C2 from the gap between connectors 153, 154 and a wire drawing port 152, and the other end of the optical fiber 125 (or light guide 125) is disposed in the gap with the light receiving surface thereof oriented downward (FIG. 16). The lower surface of the tubular support member 127 and a panel sheet metal 105 are bonded together using a double-sided tape or adhesive. The tubular support member 127 is formed of a resin, ceramic, or metal. The optical fiber 125 (or light guide 125) is formed of a transparent resin or glass, and a known optical fiber is used as appropriate.

According to the present embodiment, even when the size of the optical sensor 12 is larger than the gap (the gap between the connectors 153, 154 and the wire drawing port 152), the optical sensor mounting unit 10 can be disposed. Thus, the degree of freedom of layout design can be enhanced. While, in the present embodiment, the luminance of the backlight 150 is controlled by measuring the leak light C2 from the wire drawing port 152 formed in the back surface of the backlight, the present invention can also be applied to a configuration in which a wire drawing port is formed in a side surface of a backlight.

Fourth Embodiment

Figure 17:
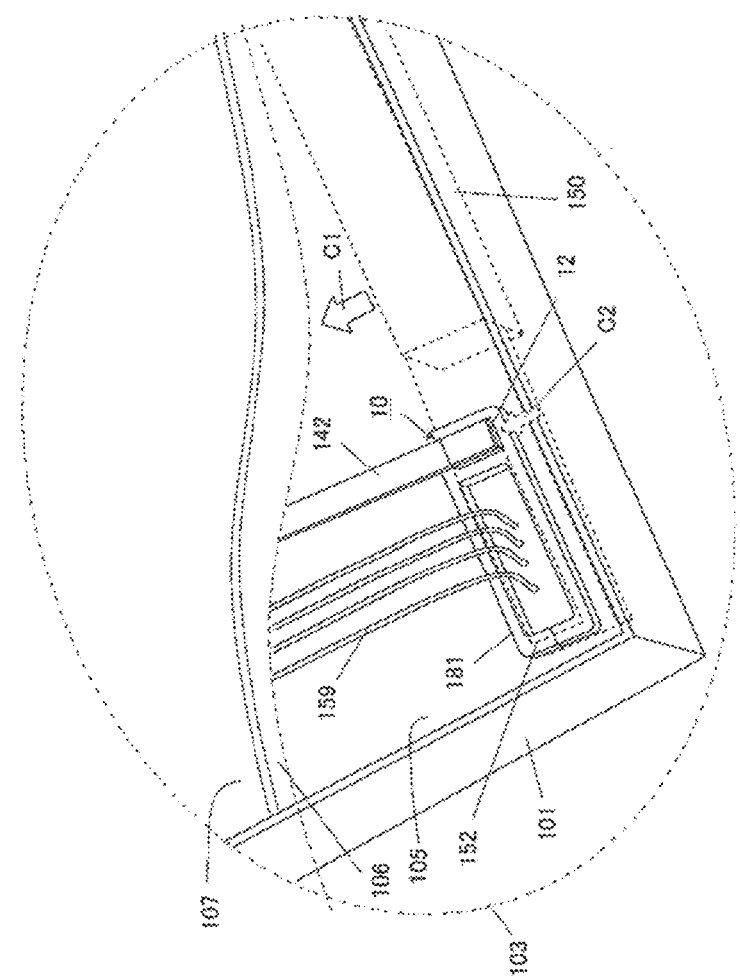
FIG. 17 is a perspective view showing the internal structure of an optical sensor mounting structure of a fourth embodiment of the present invention.
Figure 19:
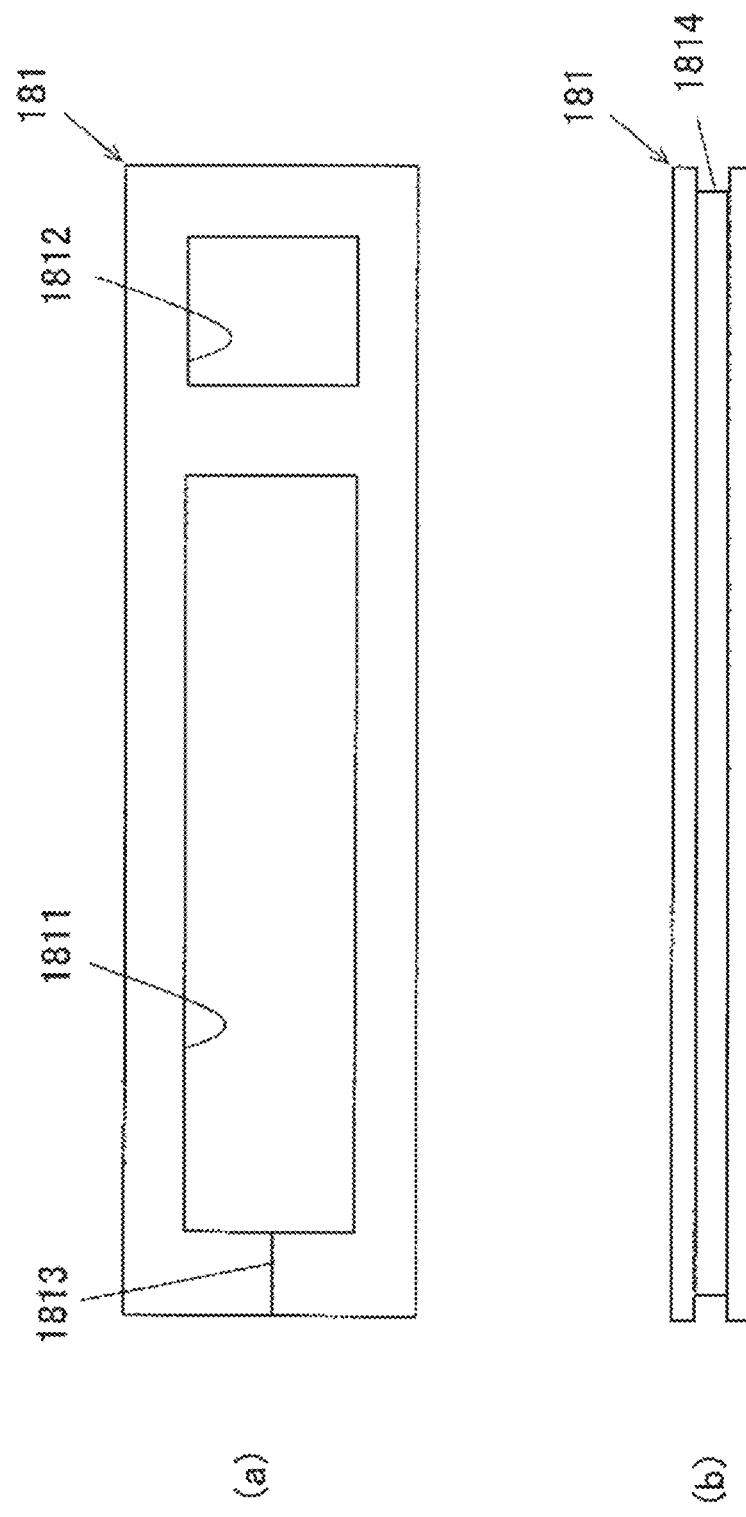

FIG. 17 is a perspective view showing the internal structure of an optical sensor mounting structure of a fourth embodiment of the present invention. FIG. 19 include diagrams showing a spacer of the present embodiment, in which FIG. 19(a) is a plan view and FIG. 19(b) is a side view. In the present embodiment, the same reference signs as those in the above embodiments denote the same functions and therefore description thereof will be omitted as appropriate.

In the present embodiment, a spacer 181 is mounted on a wire drawing port 152, and an optical sensor 12 is positioned by the spacer 181 (FIG. 17). The spacer 181 is formed of an elastic member such as a resin or rubber material and has a rectangular shape corresponding to the wire drawing port 152 and a larger size than the wire drawing port 152. The spacer 181 is a so-called rubber bush. The spacer 181 has a lead guide hole 1811 for passing a lead line 159 and a slit 1813. The spacer 181 also has a sensor guide hole 1812 into which the optical sensor 12 is fitted and which has a quadrangular shape corresponding to the optical sensor 12 and approximately the same size as the optical sensor 12 [FIG. 19(a)]. A groove 1814 to be fitted into the wire drawing port 152 is formed around the side surfaces of the spacer 181 [FIG. 19(b)]. In the optical sensor mounting unit 10, the optical sensor 12 is mounted on the lower surface of a flexible wiring board 142 (FIG. 17). The optical sensor 12 aims to measure leak LED light C2 and is fitted in the guide hole 1812 with the light receiving surface thereof oriented downward (FIG. 17). According to the present embodiment, it is easy to dispose the optical sensor 12 near the wire drawing port 152 and in a precise position. The spacer 181 prevents entry of unnecessary outside light while holding the optical sensor 12.

Figure 18:
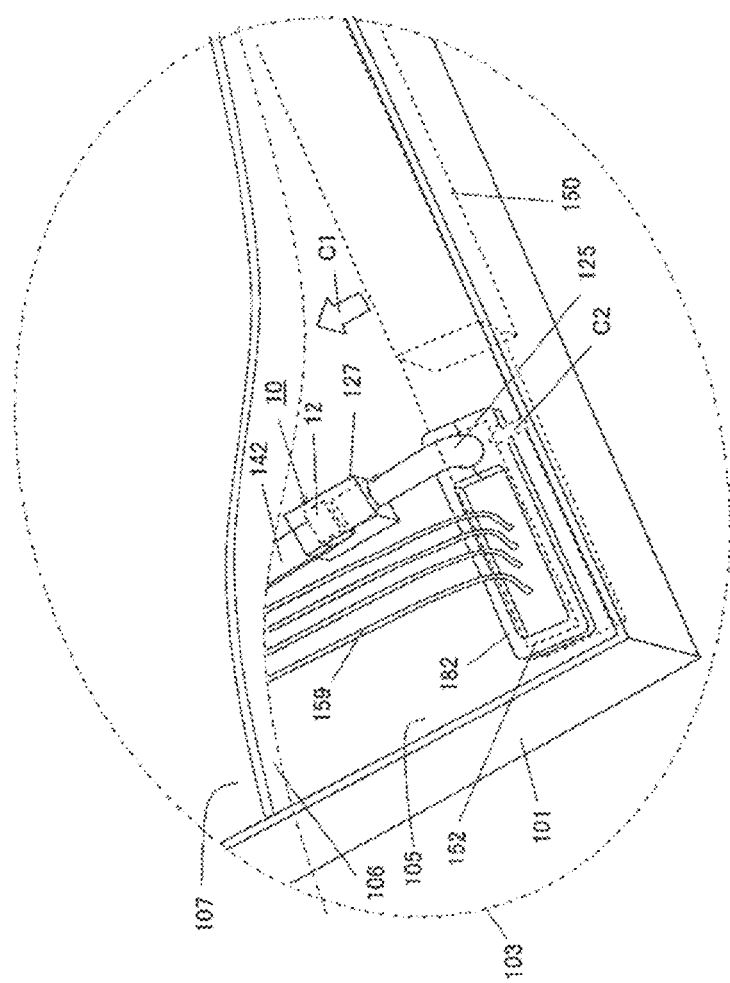
FIG. 18 is a perspective view showing the internal structure of another example of the optical sensor mounting structure of the fourth embodiment.
Figure 20:
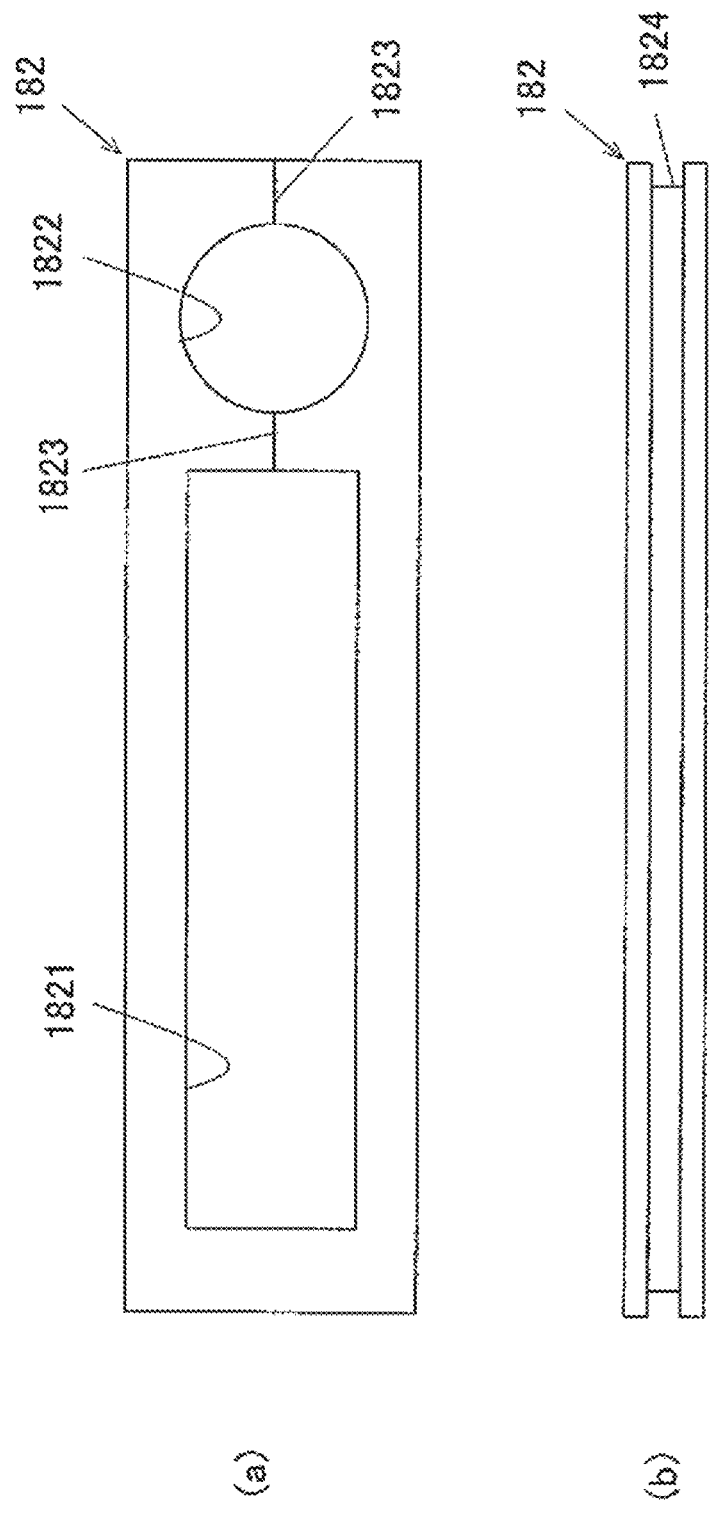

FIG. 18 is a perspective view showing the internal structure of another example of the optical sensor mounting structure of the present embodiment. FIG. 20 include diagrams showing another example of the spacer of the present embodiment, in which FIG. 20(a) is a plan view and FIG. 20(b) is a side view. In this example, the same reference signs as those in the above embodiments denote the same functions and therefore description thereof will be omitted as appropriate.

In this example, a spacer 182 is mounted on a wire drawing port 152, and an optical fiber 125 (or light guide 125) is positioned by the spacer 182 (FIG. 18). The spacer 182 is formed of an elastic member such as a resin or rubber material and has a rectangular shape corresponding to the wire drawing port 152 and a larger size than the wire drawing port 152. The spacer 182 is a so-called rubber bush. The spacer 182 has a lead guide hole 1821 for passing a lead line 159 and a slit 1823. The spacer 182 also has a fiber guide hole 1822 into which an optical fiber 125 (or light guide 125) is fitted and which has a circular shape corresponding to the optical fiber 125 (or light guide 125) and approximately the same size as the optical fiber 125 [FIG. 20(a)]. A groove 1824 to be fitted into the wire drawing port 152 is formed around the side surfaces of the spacer 182 [FIG. 20(b)]. In the optical sensor mounting unit 10, an optical sensor 12 is mounted on the upper surface of a flexible wiring board 142; one end of the optical fiber 125 (or light guide 125) is disposed so as to be opposed to the optical sensor 12; and the perimeter of the end is supported and fixed by a tubular support member 127 (FIG. 18). The optical fiber 125 (or light guide 125) aims to measure leak LED light C2 and is fitted in the guide hole 1822 with the light receiving surface thereof oriented downward (FIG. 18). According to the present embodiment, even when the size of the optical sensor 12 is larger than the wire drawing port 152, the optical sensor mounting unit 10 can be disposed. Thus, the degree of freedom of layout design can be enhanced. While, in the present embodiment, the luminance of the backlight 150 is controlled by measuring the leak light C2 from the wire drawing port 152 formed in the back surface of the backlight, the present invention can also be applied to a configuration in which a wire drawing port is formed in a side surface of a backlight.

While, in the above embodiments, the backlight 150 is disposed in a lower part of the liquid crystal image display device, the present invention is also applicable to a configuration in which a backlight is disposed in a right or left part of the device.

While, in the above embodiments, the substrate having the optical sensor 12 mounted thereon is directly or indirectly bonded to the panel sheet metal 105, the substrate having the optical sensor 12 mounted thereon may be directly or indirectly bonded and fixed to the base sheet metal.

In the present invention, tubular cushions for preventing entry of outside light into the optical sensor 12 may be bonded to the optical sensor 12, and the panel sheet metal 105 or the base sheet metal of the image display device.

The optical sensor mounting structure of the present invention may be incorporated into an image display device which is being assembled, or may be retrofitted into an assembled image display device. As seen above, changes can be made to the present invention as appropriate without departing from the spirit and scope of the invention.

1 image display device (liquid crystal display device
10 optical sensor mounting structure of present invention (optical sensor mounting unit of present invention)
11 substrate
12 optical sensor
13, 14 intermediate connector (positioning member)
150 backlight
105 panel sheet metal
106 base sheet metal
152 wire drawing port
153, 154 wire connector
C1 main LED light
C2 leak LED light

The invention claimed is:

1. An optical sensor mounting structure for use in an image display device, the image display device using an image display panel module in which a wire drawing port for drawing a wire from a backlight is formed in a panel sheet metal, the structure comprising:
an optical sensor configured to measure leak light from the backlight; and
a positioning member configured to position the optical sensor, wherein the optical sensor is disposed near the wire drawing port by the positioning member and measures the leak light from the wire drawing port;
wherein
a wire connector for connecting the wire from the backlight is disposed in the wire drawing port, and
the positioning member is mounted on a substrate having the optical sensor disposed thereon.

2. The optical sensor mounting structure of claim 1, wherein
the positioning member is an intermediate connector, and
the intermediate connector is connected to the wire connector.

3. The optical sensor mounting structure of claim 1, wherein
the positioning member is a spacer, and
the spacer is mounted on the wire drawing port.

4. The optical sensor mounting structure of claim 1, wherein
the positioning member is an inclining member, and
the inclining member inclines the optical sensor so that the amount of the received leak light is increased.

5. The optical sensor mounting structure of claim 1, wherein assuming that the wire drawing port is a reference surface, the sensor is disposed so as to be inclined with respect to the reference surface so that the amount of the received leak light is increased.

6. The optical sensor mounting structure of claim 1 comprising a display, wherein luminance of a backlight is controlled by measuring leak light from a wire drawing port formed in a panel sheet metal.

* * * * *